(12) United States Patent
Hou et al.

(10) Patent No.: US 11,612,006 B2
(45) Date of Patent: Mar. 21, 2023

(54) ROUTING METHOD AND DEVICE (71) Applicant: CHINA ACADEMY OF TELECOMMUNICATIONS TECHNOLOGY, Beijing (CN)

(72) Inventors: Yunjing Hou, Beijing (CN); Juan Zhang, Beijing (CN); Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 91 days.

(21) Appl. No.: 16/483,643

(22) PCT Filed: Feb. 2, 2018

(86) PCT No.: PCT/CN2018/075119
§ 371 (c)(1),
(2) Date: Aug. 5, 2019

(87) PCT Pub. No.: WO2018/141266
PCT Pub. Date: Aug. 9, 2018

(65) Prior Publication Data
US 2020/0037376 A1 Jan. 30, 2020

(30) Foreign Application Priority Data
Feb. 6, 2017 (CN) .......................... 201710065501.1

(51) Int. Cl.
*H04W 76/11* (2018.01)

(52) U.S. Cl.
CPC .................................. *H04W 76/11* (2018.02)

(58) Field of Classification Search
CPC ...................................................... H04W 76/11
See application file for complete search history.

(56) References Cited

U.S. PATENT DOCUMENTS

| 2016/0007257 A1 | 1/2016 | Kim et al. |
| 2019/0007921 A1* | 1/2019 | Schliwa-Bertling ........................ H04W 76/10 |
| 2019/0223060 A1* | 7/2019 | Zhou .................. H04W 36/0016 |

(Continued)

FOREIGN PATENT DOCUMENTS

| CN | 101083620 A | 12/2007 |
| CN | 105191411 A | 12/2015 |
| WO | WO-2014142570 A1 | 9/2014 |

OTHER PUBLICATIONS

Extended European Search Report dated Nov. 26, 2019 for European Patent Application No. EP 18747628.8.

(Continued)

*Primary Examiner* — Rhonda L Murphy
(74) *Attorney, Agent, or Firm* — Harness, Dickey & Pierce, P.L.C.

(57) ABSTRACT

The present disclosure provides a routing method and a routing device. The routing method includes: receiving, by an AMF, a first message from an (R)AN, the first message including session-related information and routing information associated with the session-related information; and routing, by the AMF, the session-related information to a relevant SMF in accordance with the routing information. According to the present disclosure, it is able to correctly route the session-related information between the (R)AN and the SMF.

16 Claims, 5 Drawing Sheets

---

201
receiving, by an AMF, a first message to an (R)AN, the first message including session-related information and routing information associated with the session-related information 202
routing, by the AMF, the session-related information to a relevant SMF in accordance with the routing information (56) References Cited

U.S. PATENT DOCUMENTS

2019/0273650 A1\* 9/2019 Ma ..................... H04L 41/5058
2020/0120570 A1\* 4/2020 Youn ................ H04W 36/0033

OTHER PUBLICATIONS

Nokia et al., "Interim agreement on Routing of NAS signalling and on How the AMF can select the proper SMF instance for a PDU session", SA WG2 Meeting #118, S2-167162, (was S2-166351 and S2-166609 ( 6999 ( 7151), ETRI, Agenda Item 6.10.4, Work Item / Release: NextGen / Rel14, Nov. 14-18, 2016 , Reno, NV, USA, XP051185635.
3GPP TR 23.799 V14.0.0 3rd Generation Partnership Project; Technical Specification Group Services and System Aspects; Study on Architecture for Next Generation System (Release 14), Dec. 1, 2016, Valbonne—France, XP051199312.
Preliminary Report on Patentability, dated Aug. 15, 2019, for International Application No. PCT/CN2018/075119.
NAS&S1 entry function for SM and MM separation, SA WG2 Meeting #116, S2-164253, Source: Huawei, HiSilicon, Agenda Item 6.10.3, Work Item/Release: FS_NextGen/R14,Jul. 11-15, 2016, Vienna, Austria.
"Comparison of the options for session ID allocation and routing of subsequent SM signalling", SA WG2 Meeting #118, S2-167000, Source: Huawei, Hisilicon, Agenda Item 6.10.4, Work Item/ Release: FS_Next Gen/Rel-14, Nov. 14-18, 2016, Reno, Nevada, USA.
Chinese Office Action dated Dec. 29, 2018 for CN Application No. 201710065501.1.
3GPP TS 23.502 V0.1.0, 3rd Generation Partnership Project, Technical Specification Group Services and System Aspects; Procedures for the 5G System; Stage 2 (Release 15), Jan. 31, 2017.
3GPP TS 23.501 V0.1.1, 3rd Generation Partnership Project; Technical Specification Group Services and System Aspects; System Architecture for the 5G System; Stage 2 (Release 15), Jan. 31, 2017.
Catt, "Update of the UE triggered Service Request procedure", SA WG2 Meeting #S2-119,S2-171156, Agenda Item 6.5.2, Work Item / Release: 5G_ph1/ Rel-15, Feb. 13-17, 2017. Dubrovnik, Croatia.
Nokia et al., "Interim agreement on Routing of NAS signalling and on How the AMF can select the proper SMF instance for a PDU session", S2-167151 (was S2-166351 and S2-166609 ( 6999), SA WG2 Meeting #118, ETRI, Agenda Item 6.10.4, Work Item / Release: NextGen / Rel14, Nov. 14-18, 2016 , Reno, NV, USA.
3GPP TS 23.502 V0.1.1 (Jan. 2017), 3rd Generation Partnership Project, Technical Specification Group Services and System Aspects, Procedures for the 5G System, Stage 2 (Release 15). Jan. 26, 2017, pp. 1-46, XP051230651.
Japanese Office Action dated Aug. 2, 2020 for Japanese Patent Application No. 2019-542386.
Zte, "Network triggered Service Request procedure", SA WG2 Meeting #118-BIS, S2-170272, Jan. 16-20, 2017, Spokane, WA.
Catt, "Routing of the SM message", SA WG2 Meeting #117, S2-165865, Oct. 17-21, 2016, Kaohsiung city, Taiwan.

\* cited by examiner

301 — transmitting, by an (R)AN, a first message to an AMF, the first message including session-related information and routing information associated with the session-related information, the routing information being adopted by the AMF to route the session-related information to a relevant SMF

ROUTING METHOD AND DEVICE

CROSS-REFERENCE TO RELATED APPLICATIONS

The present application is the U.S. national phase of PCT Application No. PCT/CN2018/075119 filed on Feb. 2, 2018, which claims a priority of the Chinese patent application 201710065501.1 filed on Feb. 6, 2017, which are incorporated herein by reference in their entirety.

TECHNICAL FIELD

The present disclosure relates to the field of communication technology, in particular to a routing method and a routing device.

BACKGROUND

In a conventional scheme, Session Management (SM) information is transmitted by a Session Management Function (SMF) merely to an Access and Mobility Management Function (AMF), and the SM information is not parsed by the AMF. Hence, there probably exists such a problem that the AMF cannot route a reply message when the replay message is returned by a (Radio) Access Network ((R)AN).

Hence, there is an urgent need to provide a feasible scheme to at least partially solve or improve the above problem.

SUMMARY

An object of the present disclosure is to provide a routing method and a routing device, so as to solve the problem in the related art where the AMF cannot route SM-related information from the (R)AN.

In one aspect, the present disclosure provides in some embodiments a routing method, including: receiving, by an AMF, a first message from an (R)AN, the first message including session-related information and routing information associated with the session-related information; and routing, by the AMF, the session-related information to a relevant SMF in accordance with the routing information.

In some possible embodiments of the present disclosure, prior to receiving, by the AMF, the first message from the (R)AN, the routing method further includes transmitting, by the AMF, a second message to the (R)AN. The second message includes the session-related information and the routing information associated with the session-related information, and the first message is a acknowledgement message of the second message.

In some possible embodiments of the present disclosure, the transmitting, by the AMF, the second message to the (R)AN includes: combining, by the AMF, a plurality of pieces of session-related information received from a plurality of SMFs into one second message, the second message carrying the routing information associated with each piece of session-related information; and transmitting, by the AMF, the second message to the (R)AN.

In some possible embodiments of the present disclosure, the routing, by the AMF, the session-related information to the relevant SMF in accordance with the routing information includes, upon the receipt of the first message for confirming the second message from the (R)AN, determining, by the AMF, the relevant SMF in accordance with the routing information associated with the session-related information, and transmitting the session-related information to the SMF.

In some possible embodiments of the present disclosure, the routing information includes one or more of a Protocol Data Unit (PDU) session Identity (ID), an ID allocated by the AMF, and information about the SMF.

In some possible embodiments of the present disclosure, the ID allocated by the AMF is a temporary ID corresponding to the session-related information allocated by the AMF upon the receipt of a third message from the SMF, and the third message includes the session-related information.

In some possible embodiments of the present disclosure, the information about the SMF includes one or more of an ID of the SMF, a Full Qualified Domain Name (FQDN) of the SMF, an Internet Protocol (IP) address of the SMF, and a Tunnel Endpoint Identity (TEID) of the SMF.

In some possible embodiments of the present disclosure, the routing method further includes storing, by the AMF, a routing relationship between the routing information and the SMF corresponding to the routing information.

In another aspect, the present disclosure provides in some embodiments a routing method, including transmitting, by an (R)AN, a first message to an AMF, the first message including session-related information and routing information associated with the session-related information, the routing information being adopted by the AMF to route the session-related information to a relevant SMF.

In some possible embodiments of the present disclosure, prior to transmitting, by the (R)AN, the first message to the AMF, the routing method further includes receiving, by the (R)AN, a second message from the AMF. The second message includes the session-related information and the routing information associated with the session-related information, and the first message is a acknowledgement message of the second message.

In some possible embodiments of the present disclosure, the routing information includes one or more of a PDU session ID, an ID allocated by the AMF, and information about the SMF.

In some possible embodiments of the present disclosure, the ID allocated by the AMF is a temporary ID corresponding to the session-related information allocated by the AMF upon the receipt of a third message from the SMF, and the third message includes the session-related information.

In some possible embodiments of the present disclosure, the information about the SMF includes one or more of an ID of the SMF, an FQDN of the SMF, an IP address of the SMF, and a TEID of the SMF.

In yet another aspect, the present disclosure provides in some embodiments a routing device, including: a first reception module configured to receive a first message from an (R)AN, the first message including session-related information and routing information associated with the session-related information; and a routing module configured to route the session-related information to a relevant SMF in accordance with the routing information.

In some possible embodiments of the present disclosure, the routing device further includes a first transmission module configured to transmit a second message to the (R)AN. The second message includes the session-related information and the routing information associated with the session-related information, and the first message is a acknowledgement message of the second message.

In some possible embodiments of the present disclosure, the first transmission module is further configured to: combine a plurality of pieces of session-related information received from a plurality of SMFs into one second message, the second message carrying the routing information associated with each piece of session-related information; and transmit the second message to the (R)AN.

In some possible embodiments of the present disclosure, the first transmission module is further configured to, upon the receipt of the first message for confirming the second message from the (R)AN, determine the relevant SMF in accordance with the routing information associated with the session-related information, and transmit the session-related information to the SMF.

In some possible embodiments of the present disclosure, the routing information includes one or more of a PDU session ID, an ID allocated by the AMF, and information about the SMF.

In some possible embodiments of the present disclosure, the ID allocated by the AMF is a temporary ID corresponding to the session-related information allocated by the AMF upon the receipt of a third message from the SMF, and the third message includes the session-related information.

In some possible embodiments of the present disclosure, the information about the SMF includes one or more of an ID of the SMF, an FQDN of the SMF, an IP address of the SMF, and a TEID of the SMF.

In some possible embodiments of the present disclosure, the routing device further includes a storage module configured to store a routing relationship between the routing information and the SMF corresponding to the routing information.

In still yet another aspect, the present disclosure provides in some embodiments a routing device, including a second transmission module configured to transmit a first message to an AMF, the first message including session-related information and routing information associated with the session-related information, the routing information being adopted by the AMF to route the session-related information to a relevant SMF.

In some possible embodiments of the present disclosure, the routing device further includes a second reception module configured to receive a second message from the AMF. The second message includes the session-related information and the routing information associated with the session-related information, and the first message is a acknowledgement message of the second message.

In some possible embodiments of the present disclosure, the routing information includes one or more of a PDU session ID, an ID allocated by the AMF, and information about the SMF.

In some possible embodiments of the present disclosure, the ID allocated by the AMF is a temporary ID corresponding to the session-related information allocated by the AMF upon the receipt of a third message from the SMF, and the third message includes the session-related information.

In some possible embodiments of the present disclosure, the information about the SMF includes one or more of an ID of the SMF, an FQDN of the SMF, an IP address of the SMF, and a TEID of the SMF.

In still yet another aspect, the present disclosure provides in some embodiments an AMF device, including a processor, a memory, and a computer program stored in the memory and executed by the processor. The processor is configured to execute the computer program so as to implement the above-mentioned routing method.

In still yet another aspect, the present disclosure provides in some embodiments an (R)AN device, including a processor, a memory, and a computer program stored in the memory and executed by the processor. The processor is configured to execute the computer program so as to implement the above-mentioned routing method.

In still yet another aspect, the present disclosure provides in some embodiments a computer-readable storage medium storing therein a computer program. The computer program is executed by a processor so as to implement above-mentioned routing method.

In still yet another aspect, the present disclosure provides in some embodiments a computer-readable storage medium storing therein a computer program. The computer program is executed by a processor so as to implement above-mentioned routing method.

According to the embodiments of the present disclosure, the AMF may receive the first message from the (R)AN, and the first message may include the session-related information and the routing information associated with the session-related information. Then, the AMF may route the session-related information to the relevant SMF in accordance with the routing information. As a result, it is able to correctly route the session-related information between the (R)AN and the SMF.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and embodiments. The following embodiments are for illustrative purposes only, but shall not be used to limit the scope of the present disclosure.

Actually, the embodiments are provided so as to facilitate the understanding of the scope of the present disclosure.

First Embodiment

Figure 1:
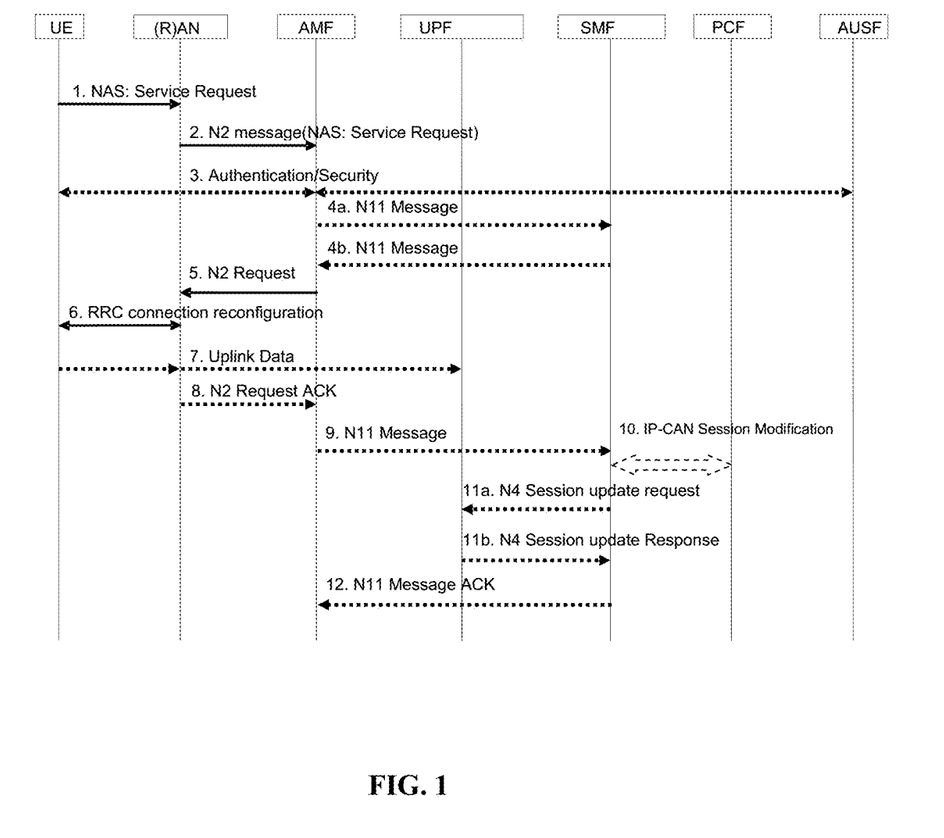
FIG. 1 is a schematic view showing a procedure of initiating, by a User Equipment (UE), a service request in the related art.

As shown in FIG. 1, a procedure of initiating, by a UE, a service request in the related art may include the following steps.

Step 1: the UE may transmit a Mobility Management (MM) Non-Access Stratum (NAS) service request message to an (R)AN, and the request message may include a PDU session ID, a security parameter and a PDU session state. The UE may package the NAS message in a Radio Resource Control (RRC) message, and transmit it to the (R)AN. The RRC message may include a temporary ID and the NAS message. When a triggering condition for the execution of the service request by the UE is a user data generated at an upper layer, the PDU session ID may be carried in the NAS service request message, so as to indicate a PDU session to be activated by the UE. When merely a signaling connection is established for the UE, it is unnecessary for the UE to transmit the PDU session ID. When the initiation of the procedure is triggered by a paging message and the UE needs to activate the PDU session, the PDU session ID may be carried in an NAS session request message, so as to indicate the PDU session to be activated. Otherwise, no PDU session ID may be carried in the request message. The PDU session state may be adopted to indicate an available PDU session for the UE.

Step 2: the (R)AN may transmit an N2 message to an AMF, and the N2 message may include the NAS service request, a temporary ID, position information, a Radio Access Technologies (RAT) type, and an RRC establishment cause. The (R)AN may select the AMF in accordance with the temporary ID, and the position information and the RAT type may be related to a cell in which the UE resides.

Step 3: when the service request is not subjected to integrity protection or an integrity protection examination fails, the AMF may initiate an NAS authentication/security procedure. When the UE wants to establish the signaling connection, it may transmit uplink signaling after the end of security interaction, and it is unnecessary for the UE to continue to perform the subsequent steps.

Step 4 may include the following two steps.

Step 4a (optional): the AMF may transmit an N11 message to an SMF, and the N11 message may include the PDU session ID.

Step 4b (optional): the SMF may transmit an N11 message to the AMF, and the N11 message may be N2 SM information including a Quality of Service (QoS) attribute and Core Network (CN) N3 tunnel information. Upon the receipt of the message in Step 4a, the SMF may transmit the N11 message to the AMF, so as to establish a user plane for the PDU session. The N2 SM information may include information to be provided by the AMF to the (R)AN.

Step 5 (optional): the AMF may transmit an N2 request message to the (R)AN, and the N2 request message may include the N2 SM information received from the SMF, a security context, an AMF signaling connection ID, and a switching limit list and NAS service acceptation message. The (R)AN may store the security context, the AMF signaling connection ID, QoS information about a QoS stream for the activated PDU session, and an N3 tunnel ID in a context of the UE. The NAS service acceptation message may include the PDU session state in the AMF.

Step 6: the (R)AN may execute an RRC connection reconfiguration procedure in accordance with the QoS information about the QoS stream for the activated PDU session, and transmit the NAS service acceptation message to the UE. The UE may delete a context of the PDU session not activated by a core network.

Step 7: after an RRC connection has been established at the user plane, uplink data from the UE may be transmitted to the (R)AN. The (R)AN may transmit the data to a User Port Function (UPF) in Step 4.

Step 5 (optional): the (R)AN may transmit an N2 request acknowledgement message to the AMF, and the N2 request acknowledgement message may include the N2 SM information. The N2 SM information may include (R)AN tunnel information, an accepted QoS stream for the activated PDU session, and a rejected QoS stream for the activated PDU session. When the N2 message has been transmitted by the AMF in Step 5, the N2 SM information may be returned using an independent N2 SM message.

Step 9 (optional): the AMF may transmit an N11 message to the SMF with respect to each accepted PDU session, and the N11 message may include the N2 SM information and the RAT type. The N2 SM information may include the (R)AN tunnel information.

Step 10 (optional): when a dynamic Policy Control and Charging has been deployed, the SMF may initiate an IP-Connectivity Access Network (CAN) session modification procedure, so as to provide new position information to a Packet Control Function (PCF).

Step 11 may include the following two steps.

Step 11a (optional): the SMF may transmit an N4 session update request to the UPF, and the N4 session update request may include the (R)AN tunnel information. When it is necessary to establish or update the user plane, the SMF may initiate an N4 session modification procedure, and provide the (R)AN tunnel information.

Step 11b (optional): the UPF may transmit an N4 session update replay message to the SMF.

Step 12: the SMF may transmit an N11 message acknowledgement message to the AMF.

Figure 2:
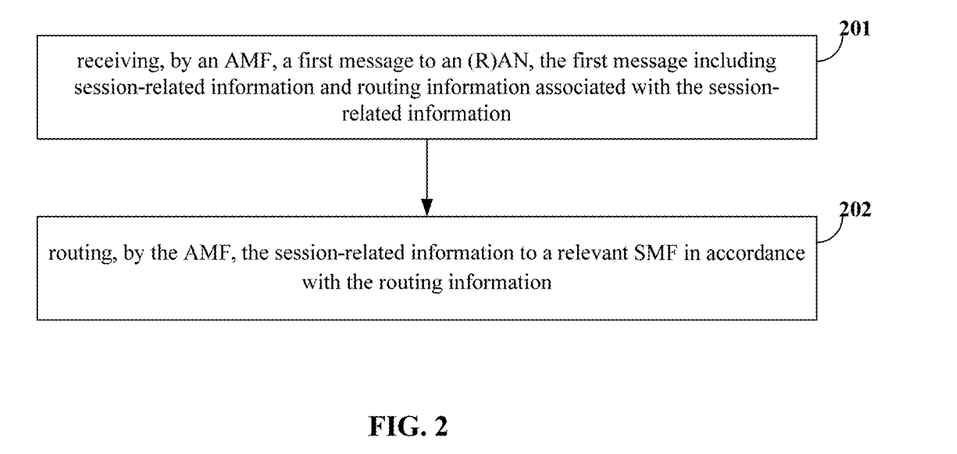
FIG. 2 is a flow chart of a routing method according to a first embodiment of the present disclosure.

As shown in FIG. 2, the present disclosure provides in this embodiment a routing method, which includes the following steps.

Step 201: receiving, by an AMF, a first message to an (R)AN, the first message including session-related information and routing information associated with the session-related information.

The AMF may be an access management function, or it may also be called as an access management function entity.

The session-related information may be session management information, e.g., N2 SM information.

The routing information may also be called as association information, and it may include one or more of a PDU session ID, an ID allocated by the AMF, and information about an SMF. Taking the PDU session ID as an example, through the routing information (the association information), a response may be associated by the AMF to a relevant SMF (i.e., a related SMF). Here, the relevant SMF may be, but not limited to, the related SMF capable of processing the N2 SM information.

In some possible embodiments of the present disclosure, the ID allocated by the AMF may be a temporary ID corresponding to the session-related information allocated upon the receipt of a third message from the SMF. The third message may include the session-related information, which may refer to that mentioned in the following fifth embodiment.

In some possible embodiments of the present disclosure, the information about the SMF may include one or more of an ID of the SMF, an FQDN of the SMF, an IP address of the SMF, and a TEID of the SMF.

Step 202: routing, by the AMF, the session-related information to the relevant SMF (i.e., the related SMF) in accordance with the routing information.

The SMF may be a session management function, or it may also be called as a session management function entity.

Figure 4:
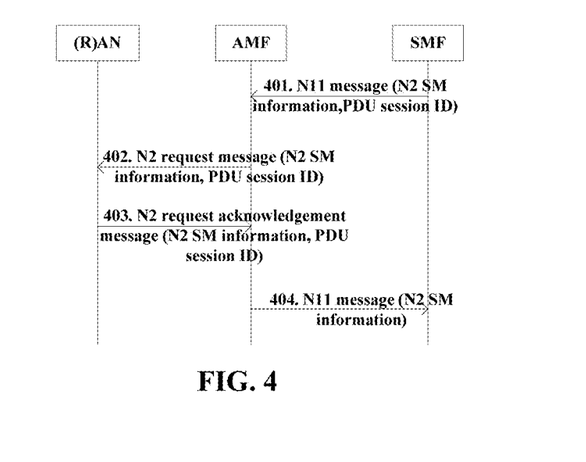
FIG. 4 is a schematic view showing a signaling procedure when routing information is a PDU session ID according to a third embodiment of the present disclosure.
Figure 5:
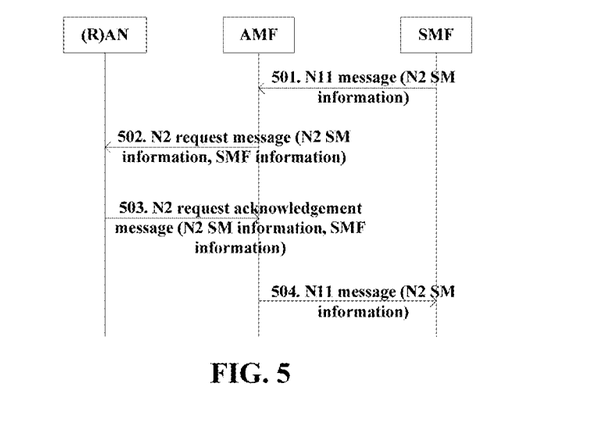
FIG. 5 is a schematic view showing a signaling procedure when routing information is information about an SMF according to a fourth embodiment of the present disclosure.

In some possible embodiments of the present disclosure, prior to receiving, by the AMF, the first message from the (R)AN, the routing method may further include transmitting, by the AMF, a second message to the (R)AN, the second message may include the session-related information and the routing information associated with the session-related information, and the first message may be a acknowledgement message of the second message, as shown in Step 402 in FIG. 4 and Step 502 in FIG. 5.

Figure 7:
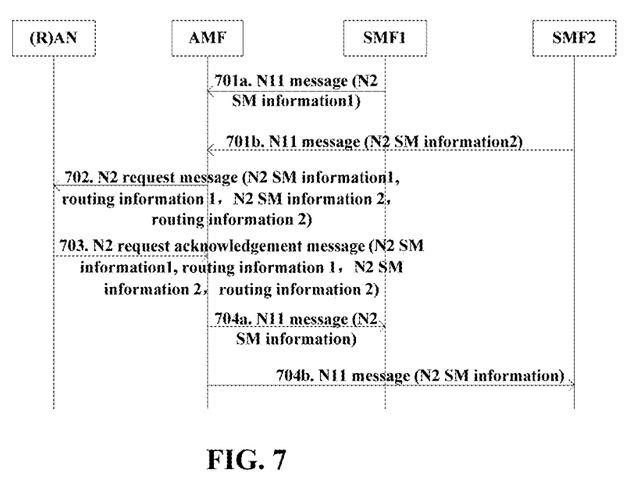
FIG. 7 is a schematic view showing a procedure of combining or splitting, by the AMF, SM information and routing the message upon the receipt of the SM information from a plurality of SMFs providing services for a UE according to a sixth embodiment of the present disclosure.

In some possible embodiments of the present disclosure, the transmitting, by the AMF, the second message to the (R)AN may include: combining, by the AMF, a plurality of pieces of session-related information received from a plurality of SMFs into one second message, the second message carrying the routing information associated with each piece of session-related information; and transmitting, by the AMF, the second message to the (R)AN, as shown in Step 702 in FIG. 7.

In some possible embodiments of the present disclosure, Step 202 (i.e., the routing, by the AMF, the session-related information to the relevant SMF (i.e., the related SMF) in accordance with the routing information) may include, upon the receipt of the first message for confirming the second message from the (R)AN, determining, by the AMF, the relevant SMF in accordance with the routing information associated with the session-related information, and transmitting the session-related information to the SMF.

In some possible embodiments of the present disclosure, the routing method may further include storing, by the AMF, a routing relationship between the routing information and the SMF corresponding to the routing information.

Hence, through Steps 201 and 202, it is able to correctly route the session-related information between the (R)AN and the SMF.

Second Embodiment

Figure 3:
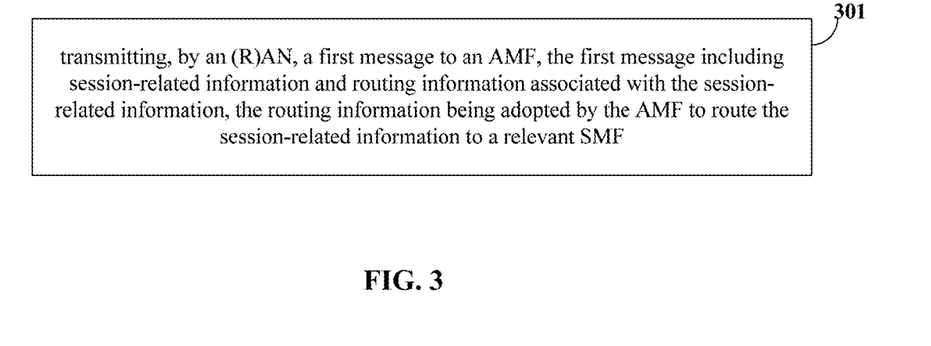
FIG. 3 is a flow chart of a routing method according to a second embodiment of the present disclosure.

As shown in FIG. 3, the present disclosure further provides in this embodiment a routing method, which includes Step 301 of transmitting, by an (R)AN, a first message to an AMF, the first message including session-related information and routing information associated with the session-related information, the routing information being adopted by the AMF to route the session-related information to a relevant SMF.

The AMF may be an access management function, or it may also be called as an access management function entity.

The session-related information may be session management information, e.g., N2 SM information.

The routing information may include one or more of a PDU session ID, an ID allocated by the AMF, and information about the SMF.

In some possible embodiments of the present disclosure, the ID allocated by the AMF may be a temporary ID corresponding to the session-related information allocated upon the receipt of a third message from the SMF. The third message may include the session-related information, which may refer to that mentioned in the following fifth embodiment.

In some possible embodiments of the present disclosure, the information about the SMF may include one or more of an ID of the SMF, an FQDN of the SMF, an IP address of the SMF, and a TEID of the SMF.

In some possible embodiments of the present disclosure, prior to transmitting, by the (R)AN, the first message to the AMF, the routing method may further include receiving, by the (R)AN, a second message from the AMF. The second message may include the session-related information and the routing information associated with the session-related information, and the first message may be a acknowledgement message of the second message.

Through the above-mentioned steps, it is able to correctly route the session-related information between the (R)AN and the SMF.

Third Embodiment

A signaling procedure will be described in this embodiment when the routing information is the PDU session ID.

As shown in FIG. 4, the signaling procedure may include the following steps.

Step 401: the SMF may transmit an N11 message to the AMF, and the N11 message may include the N2 SM information and the PDU session ID.

Step 402: the AMF may transmit an N2 request message to the (R)AN, and the N2 request message may include the N2 SM information and the PDU session ID.

Step 403: the (R)AN may return an N2 request acknowledgement message to the AMF, and the N2 request acknowledgement message may include the N2 SM information and the PDU session ID.

Step 404: the AMF may search for a context of a UE in accordance with the PDU session ID, determine the related SMF, and transmit the N11 message to the SMF. The N11 message may include the N2 SM information.

Through the above-mentioned Steps 401 to 404, it is able to correctly route the session-related information between the (R)AN and the SMF.

Fourth Embodiment

A signaling procedure will be described in this embodiment when the routing information is the information about the SMF.

As shown in FIG. 5, the signaling procedure may include the following steps.

Step 501: the SMF may transmit an N11 message to the AMF, and the N11 message may include the N2 SM information.

Step 502: the AMF may transmit an N2 request message to the (R)AN, and the N2 request message may include the N2 SM information and the information about the SMF. The information about the SMF may include, but not limited to, the ID of the SMF or the IP address of the SMF.

Step 503: the (R)AN may return an N2 request acknowledgement message to the AMF, and the N2 request acknowledgement message may include the N2 SM information and the information about the SMF.

Step 504: the AMF may transmit the N11 message to the SMF in accordance with the information about the SMF, and the N11 message may include the N2 SM information.

Through Steps 501 to 504, it is able to correctly route the session-related information between the (R)AN and the SMF.

Fifth Embodiment

A signaling procedure will be described in this embodiment when the routing information is the ID allocated by the AMF.

Figure 6:
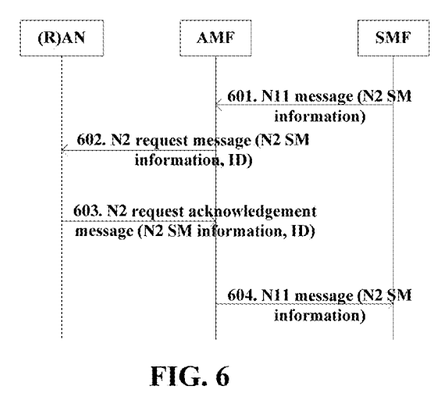
FIG. 6 is a schematic view showing a signaling procedure when routing information is an ID allocated by an AMF according to a fifth embodiment of the present disclosure.

As shown in FIG. 6, the signaling procedure may include the following steps.

Step 601: the SMF may transmit an N11 message to the AMF, and the N11 message may include the N2 SM information.

Step 602: the AMF may allocate a temporary ID, store a mapping relationship between the temporary ID and the received N11 message locally, and transmit an N2 request message to the (R)AN. The N2 request message may include the N2 SM information and the ID allocated by the AMF.

Step 603: the (R)AN may return an N2 request acknowledgement message to the AMF, and the N2 request acknowledgement message may include the N2 SM information and the ID allocated by the AMF.

Step 604: the AMF may search the N11 message related to the ID allocated by the AMF, generate a reply message related to the N11 message, and transmit the N11 message to the SMF. The N11 message may include the N2 SM information.

Through the above Steps 601 to 604, it is able to correctly route the session-related information between the (R)AN and the SMF.

Sixth Embodiment

A procedure of combining or splitting, by the AMF, SM information and routing the message upon the receipt of the SM information from a plurality of SMFs providing services for a UE will be described in this embodiment.

As shown in FIG. 7, the procedure may include the following steps.

Step 701a: the AMF may receive an N11 message from an SMF1, and the N11 message may include N2 SM information 1.

Step 701b: the AMF may receive an N11 message from an SMF2, and the N11 message may include N2 SM information 2.

Step 702: because the two N11 message are associated with the same UE, the AMF may generate one N2 request message carrying the N2 SM information 1, routing information about the N2 SM information 1 (i.e., routing information 1), the N2 SM information 2, and routing information about the N2 SM information 2 (i.e., routing information 2), and transmit the N2 request message to the (R)AN.

Step 703: the (R)AN may process each piece of N2 SM information in the request message, generate corresponding reply information, and transmit an N2 request acknowledgement message to the AMF. The N2 request acknowledgement message may include the N2 SM information 1, the routing information about the N2 SM information 1 (i.e., the routing information 1), the N2 SM information 2, and the routing information about the N2 SM information 2 (i.e., the routing information 2).

Step 704: upon the receipt of the N2 request acknowledgement message from the (R)AN, the AMF may determine an SMF to which the N2 SM information is to be transmitted in accordance with the routing information in each information pair consisting of the N2 SM information and the routing information, and transmit the N11 message to the SMF. The N11 message may carry the N2 SM information returned by the (R)AN.

The above procedure may be generated in a service request procedure. For example, when a plurality of PDU session IDs is carried in a service request message by the UE and these PDU sessions are to be executed by different SMFs, the AMF needs to trigger each SMF to activate a user plane connection for a corresponding PDU session. In the procedure, the AMF may receive the N11 messages from different SMFs at an approximately same time point.

Through the above Steps 701 to 704, it is able to correctly route the session-related information between the (R)AN and the SMF.

Seventh Embodiment

Based on a same inventive concept, the present disclosure further provides in this embodiment a routing device. A principle of the routing device for solving the problem is similar to that of the routing method as shown in FIGS. 2 and 4-7, so the implementation of the routing device may refer to that of the routing method.

Figure 8:
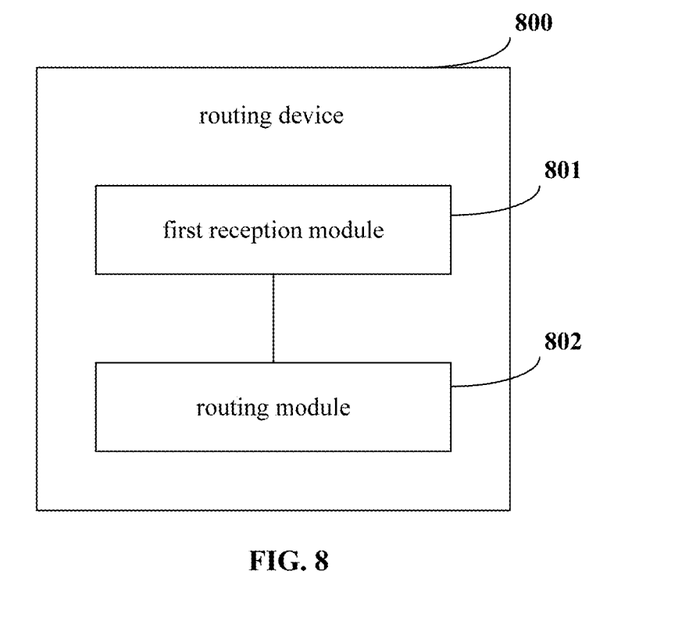
FIG. 8 is a block diagram of a routing device according to a seventh embodiment of the present disclosure.

As shown in FIG. 8, the routing device 800 may include: a first reception module 801 configured to receive a first message from an (R)AN, the first message including session-related information and routing information associated with the session-related information; and a routing module 802 configured to route the session-related information to a relevant SMF in accordance with the routing information.

In some possible embodiments of the present disclosure, the routing device may further include a first transmission module configured to transmit a second message to the (R)AN. The second message may include the session-related information and the routing information associated with the session-related information, and the first message may be a acknowledgement message of the second message.

In some possible embodiments of the present disclosure, the first transmission module is further configured to: combine a plurality of pieces of session-related information received from a plurality of SMFs into one second message, the second message carrying the routing information associated with each piece of session-related information; and transmit the second message to the (R)AN.

In some possible embodiments of the present disclosure, the first transmission module is further configured to, upon the receipt of the first message for confirming the second message from the (R)AN, determine the relevant SMF in accordance with the routing information associated with the session-related information, and transmit the session-related information to the SMF.

In some possible embodiments of the present disclosure, the routing information may include one or more of a PDU session ID, an ID allocated by the AMF, and information about the SMF.

In some possible embodiments of the present disclosure, the ID allocated by the AMF may be a temporary ID corresponding to the session-related information allocated by the AMF upon the receipt of a third message from the SMF, and the third message includes the session-related information.

In some possible embodiments of the present disclosure, the information about the SMF may include one or more of an ID of the SMF, an FQDN of the SMF, an IP address of the SMF, and a TEID of the SMF.

In some possible embodiments of the present disclosure, the routing device may further include a storage module configured to store a routing relationship between the routing information and the SMF corresponding to the routing information.

Eighth Embodiment

Based on a same inventive concept, the present disclosure further provides in this embodiment a routing device. A principle of the routing device for solving the problem is similar to that of the routing method as shown in FIGS. 3-7, so the implementation of the routing device may refer to that of the routing method.

Figure 9:
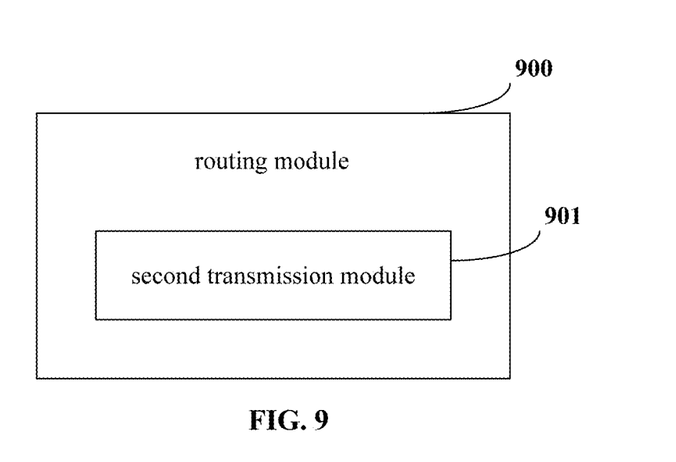
FIG. 9 is a block diagram of a routing device according to an eighth embodiment of the present disclosure.

As shown in FIG. 9, the routing device 900 may include a second transmission module 901 configured to transmit a first message to an AMF, the first message including session-related information and routing information associated with the session-related information, the routing information being adopted by the AMF to route the session-related information to a relevant SMF.

In some possible embodiments of the present disclosure, the routing device may further include a second reception module (not shown) configured to receive a second message from the AMF. The second message includes the session-related information and the routing information associated with the session-related information, and the first message is a acknowledgement message of the second message.

In some possible embodiments of the present disclosure, the routing information may include one or more of a PDU session ID, an ID allocated by the AMF, and information about the SMF.

In some possible embodiments of the present disclosure, the ID allocated by the AMF may be a temporary ID corresponding to the session-related information allocated by the AMF upon the receipt of a third message from the SMF, and the third message includes the session-related information.

In some possible embodiments of the present disclosure, the information about the SMF may include one or more of an ID of the SMF, an FQDN of the SMF, an IP address of the SMF, and a TEID of the SMF.

Ninth Embodiment

Based on a same inventive concept, the present disclosure further provides in this embodiment a routing device. A principle of the routing device for solving the problem is similar to that of the routing method as shown in FIGS. 2 and 4-7, so the implementation of the routing device may refer to that of the routing method.

Figure 10:
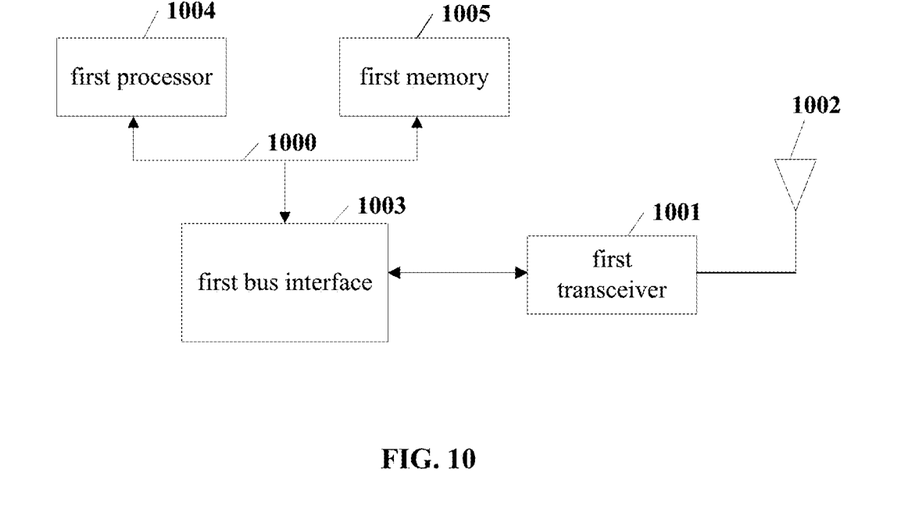
FIG. 10 is a block diagram of a routing device according to a ninth embodiment of the present disclosure.

As shown in FIG. 10, the routing device may include a first processor 1004, a first memory 1005 and a first transceiver 1001. The first processor 1004 is configured to read a program stored in the first memory 1005, so as to: receive a first message from an (R)AN, the first message including session-related information and routing information associated with the session-related information; and route the session-related information to a relevant SMF in accordance with the routing information. The first transceiver 1001 is configured to receive and transmit data under the control of the first processor 1004.

In FIG. 10, bus architecture (represented by a first bus 1000) may include a number of buses and bridges connected to each other, so as to connect various circuits for one or more processors 1004 and one or more memories 1005. In addition, as is known in the art, the first bus 1000 may also be used to connect any other circuits, such as a circuit for a peripheral device, a circuit for a voltage stabilizer and a power management circuit, which are not particularly defined herein. A first bus interface 1003 may be provided between the first bus 1000 and the first transceiver 1001, and the first transceiver 1001 may consist of one element, or more than one element, e.g., a transmitter and a receiver for communication with any other devices over a transmission medium. Data processed by the first processor 1004 may be transmitted on a wireless medium via the first transceiver 1001 and a first antenna 1002. Further, the first antenna 1002 may further receive data and transmit the data to the first processor 1004 via the first transceiver 1001.

The first processor 1004 may take charge of managing the first bus 1000 as well as general processings, and may further provide various functions such as timing, peripheral interfacing, voltage adjustment, power source management and any other control functions. The first memory 1005 may store therein data for the operation of the first processor 1004. To be specific, the first processor 1004 may be a Central Processing Unit (CPU), an Application Specific Integrated Circuit (ASIC), a Field-Programmable Gate Array (FPGA) or a Complex Programmable Logic Device (CPLD).

In some possible embodiments of the present disclosure, the first processor 1004 is further configured to transmit a second message to the (R)AN. The second message may include the session-related information and the routing information associated with the session-related information, and the first message may be a acknowledgement message of the second message.

In some possible embodiments of the present disclosure, the first processor 1004 is further configured to: combine a plurality of pieces of session-related information received from a plurality of SMFs into one second message, the second message carrying the routing information associated with each piece of session-related information; and transmit the second message to the (R)AN.

In some possible embodiments of the present disclosure, the first processor 1004 is further configured to, upon the receipt of the first message for confirming the second message from the (R)AN, determine the relevant SMF in accordance with the routing information associated with the session-related information, and transmit the session-related information to the SMF.

In some possible embodiments of the present disclosure, the first processor 1004 is further configured to store a routing relationship between the routing information and the SMF corresponding to the routing information.

Tenth Embodiment

Based on a same inventive concept, the present disclosure further provides in this embodiment a routing device. A principle of the routing device for solving the problem is similar to that of the routing method as shown in FIGS. 3-7, so the implementation of the routing device may refer to that of the routing method.

Figure 11:
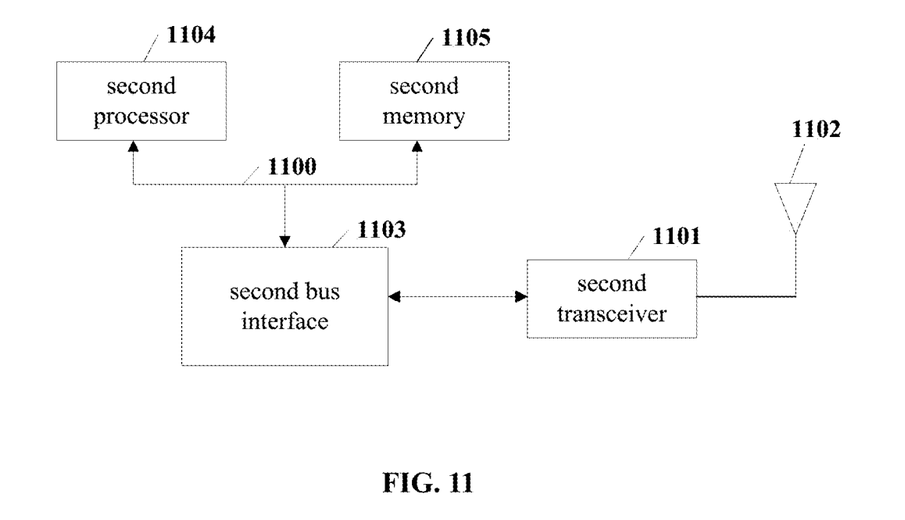
FIG. 11 is a block diagram of a routing device according to a tenth embodiment of the present disclosure.

As shown in FIG. 11, the routing device may include a second processor 1104, a second memory 1105 and a second transceiver 1101. The second processor 1104 is configured to read a program stored in the second memory 1105, so as to: transmit a first message to an AMF, the first message including session-related information and routing information associated with the session-related information, the routing information being adopted by the AMF to route the session-related information to a relevant SMF. The second transceiver 1101 is configured to receive and transmit data under the control of the second processor 1104.

In FIG. 11, bus architecture (represented by a first bus 1100) may include a number of buses and bridges connected to each other, so as to connect various circuits for one or more processors 1104 and one or more memories 1105. In addition, as is known in the art, the first bus 1100 may also be used to connect any other circuits, such as a circuit for a peripheral device, a circuit for a voltage stabilizer and a power management circuit, which are not particularly defined herein. A first bus interface 1103 may be provided between the first bus 1100 and the first transceiver 1101, and the first transceiver 1101 may consist of one element, or more than one element, e.g., a transmitter and a receiver for communication with any other devices over a transmission medium. Data processed by the first processor 1104 may be transmitted on a wireless medium via the first transceiver 1101 and a first antenna 1102. Further, the first antenna 1102 may further receive data and transmit the data to the first processor 1104 via the first transceiver 1101.

The first processor 1104 may take charge of managing the first bus 1100 as well as general processings, and may further provide various functions such as timing, peripheral interfacing, voltage adjustment, power source management and any other control functions. The first memory 1105 may store therein data for the operation of the first processor 1104. To be specific, the first processor 1104 may be a CPU, an ASIC, an FPGA or a CPLD.

In some possible embodiments of the present disclosure, the second processor 1104 is further configured to receive a second message from the AMF. The second message may include the session-related information and the routing information associated with the session-related information, and the first message may be a acknowledgement message of the second message.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, serial numbers of the steps shall not be used to define the order of the steps, and instead, the order of the steps shall be determined in accordance with their functions and internal logics.

In addition, the terms "system" and "network" may be replaced with each other. The expression "and/or" is merely used to describe the relationship between objects, and it includes three relationships. For example, "A and/or B" may represent that, there is only A, there are both A and B, and there is only B. Further, the symbol "/" usually refers to "or".

It should be further appreciated that, the expression "B corresponding to A" means that B is associated with A and may be determined in accordance with A. However, when B is determined in accordance with A, it means that B may be determined in accordance with A and/or any other information.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A routing method performed by an Access and Mobility Management Function (AMF), the routing method comprising:
   receiving, by the AMF, first N2 Session management (SM) information directly from a first Session Management Function (SMF);
   receiving, by the AMF, second N2 SM information directly from a second SMF;
   combining, by the AMF, the first N2 SM information received from the first SMF and the second N2 SM information received from the second SMF into one N2 request message, wherein the one N2 request message carries therein the first N2 SM information, routing information about the first N2 SM information, the second N2 SM information, routing information about the second N2 SM information;
   transmitting, by the AMF, the one N2 request message to a (Radio) Access Network ((R)AN); and
   receiving, by the AMF, N2 request acknowledgement message from the (R)AN, and determining whether the first SMF or the second SMF to which a plurality pieces of N2 SM information is to be transmitted in accordance with routing information in respective information pairs each consisting of N2 SM information and its corresponding routing information.

2. The routing method according to claim 1, wherein subsequent to the determining whether the first SMF or the second SMF to which a plurality pieces of N2 SM information is to be transmitted in accordance with routing information in respective information pairs each consisting of N2 SM information and its corresponding routing information, the routing method further comprises:
   transmitting, by the AMF, an N11 message carrying the N2 SM information returned by the (R)AN to the determined SMF between the first SMF and the second SMF.

3. The routing method according to claim 1, wherein the routing information comprises at least one of a Protocol Data Unit (PDU) session Identity (ID), an ID allocated by the AMF, or information about the first SMF or the second SMF.

4. The routing method according to claim 3, wherein the ID allocated by the AMF is a temporary ID corresponding to session-related information allocated by the AMF.

5. The routing method according to claim 3, wherein the information about the first SMF or the second SMF comprises at least one of an ID of the first SMF or the second SMF, a Full Qualified Domain Name (FQDN) of the first SMF or the second SMF, an Internet Protocol (IP) address of the SMF, and a Tunnel Endpoint Identity (TEID) of the first SMF or the second SMF.

6. A non-transitory computer-readable storage medium storing therein a computer program, wherein the computer program is executed by a processor of an Access and Mobility Management Function (AMF) so as to implement the routing method according to claim 1.

7. A routing method performed by an Access and Mobility Management Function (AMF), the routing method comprising:
receiving, by the AMF, an N11 message from a Session Management Function (SMF), wherein the N11 message comprises first N2 SM information;
allocating, by the AMF, a temporary ID, and storing at the AMF a mapping relationship between the temporary ID allocated by the AMF and the received N11 message received from the SMF;
transmitting, by the AMF, an N2 request message to a (Radio) Access Network ((R)AN), wherein the N2 request message comprises the first N2 SM information and the temporary ID allocated by the AMF;
receiving, by the AMF, an N2 request acknowledge message from the (R)AN, wherein the N2 request acknowledgement message comprises second N2 SM information and the temporary ID allocated by the AMF; and
searching for, by the AMF, an N11 message related to the temporary ID allocated by the AMF in accordance with the temporary ID allocated by the AMF, generating a reply message related to the N11 message, and transmitting the generated reply message to the SMF, wherein the generated reply message comprises the second N2 SM information.

8. The routing method according to claim 7, wherein the temporary ID allocated by the AMF is a temporary ID corresponding to the session-related information allocated by the AMF.

9. An Access and Mobility Management Function (AMF) device, comprising a processor, a memory, and a computer program stored in the memory and executed by the processor, wherein the processor is configured to execute the computer program so as to implement the routing method performed by the AMF according to claim 7.

10. The AMF device according to claim 9, wherein the temporary ID allocated by the AMF is a temporary ID corresponding to the session-related information allocated by the AMF.

11. A non-transitory computer-readable storage medium storing therein a computer program, wherein the computer program is executed by a processor of an Access and Mobility Management Function (AMF) so as to implement the routing method according to claim 7.

12. An Access and Mobility Management Function (AMF) device, comprising a processor, a memory, and a computer program stored in the memory and executed by the processor, wherein the processor is configured to execute the computer program so as to implement a routing method performed by the AMF, the routing method comprising:
receiving, by the AMF, first N2 Session management (SM) information directly from a first Session Management Function (SMF);
receiving, by the AMF, second N2 SM information directly from a second SMF;
combining, by the AMF, the first N2 SM information received from the first SMF and the second N2 SM information received from the second SMF into one N2 request message, wherein the one N2 request message carries therein the first N2 SM information, routing information about the first N2 SM information, the second N2 SM information, routing information about the second N2 SM information;
transmitting, by the AMF, the one N2 request message to a (Radio) Access Network ((R)AN); and
receiving, by the AMF, N2 request acknowledgement message from the (R)AN, and determining whether the first SMF or the second SMF to which a plurality pieces of N2 SM information is to be transmitted in accordance with routing information in respective information pairs each consisting of N2 SM information and its corresponding routing information.

13. The AMF device according to claim 12, wherein subsequent to the determining whether the first SMF or the second SMF to which a plurality pieces of N2 SM information is to be transmitted in accordance with routing information in respective information pairs each consisting of N2 SM information and its corresponding routing information, the routing method further comprises:
transmitting, by the AMF, an N11 message carrying the N2 SM information returned by the (R)AN to the determined SMF between the first SMF and the second SMF.

14. The AMF device according to claim 12, wherein the routing information comprises at least one of a Protocol Data Unit (PDU) session Identity (ID), an ID allocated by the AMF, or information about the first SMF or the second SMF.

15. The AMF device according to claim 14, wherein the ID allocated by the AMF is a temporary ID corresponding to session-related information allocated by the AMF.

16. The AMF device according to claim 14, wherein the information about the first SMF or the second SMF comprises at least one of an ID of the first SMF or the second SMF, a Full Qualified Domain Name (FQDN) of the first SMF or the second SMF, an Internet Protocol (IP) address of the SMF, and a Tunnel Endpoint Identity (TEID) of the first SMF or the second SMF.

* * * * *